(12) United States Patent
Koegler

(10) Patent No.: US 6,318,546 B2
(45) Date of Patent: *Nov. 20, 2001

(54) PALLET RETENTION AND RELEASE SYSTEM

(75) Inventor: William A. Koegler, Waterloo (CA)

(73) Assignee: Lawson Automotive Inc., Cambridge (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,374

(22) Filed: Dec. 24, 1998

Related U.S. Application Data

(60) Provisional application No. 60/068,749, filed on Dec. 24, 1997.

(51) Int. Cl.[7] ................................................ B65G 29/00
(52) U.S. Cl. .............................. 198/867.14; 198/867.13; 198/465.1
(58) Field of Search ..................... 198/465.1, 473.1, 198/867.13, 867.14

(56) References Cited

U.S. PATENT DOCUMENTS

| | | | |
|---|---|---|---|
| 2,672,675 | * 3/1954 | Cross | 198/345.3 |
| 3,338,382 | * 8/1967 | Fogg | 198/867.14 |
| 3,648,819 | 3/1972 | Converse, III et al. . | |
| 4,088,220 | * 5/1978 | Jacksch et al. | 198/345.3 |
| 4,401,208 | 8/1983 | Allmacher, Jr. . | |
| 4,431,103 | 2/1984 | Sekii . | |
| 4,793,261 | * 12/1988 | Schwaemmle | 198/867.13 |
| 4,813,529 | 3/1989 | Kawai et al. . | |
| 4,928,806 | 5/1990 | Anderson et al. . | |
| 5,060,781 | 10/1991 | Santandrea et al. . | |
| 5,065,678 | * 11/1991 | Rhodes | 198/465.1 |
| 5,321,874 | 6/1994 | Mills et al. . | |
| 5,337,887 | * 8/1994 | Greenwell et al. | 198/867.14 |
| 5,474,166 | 12/1995 | Santandrea et al. . | |
| 5,600,059 | 2/1997 | Sondey . | |
| 5,874,452 | * 2/1999 | Nolan | 198/867.13 |
| 5,893,447 | * 4/1999 | Brintazzoli | 198/345.3 |

FOREIGN PATENT DOCUMENTS

| | | | |
|---|---|---|---|
| 1251413 | 3/1989 | (CA) . | |
| 2144756 | 3/1994 | (CA) . | |
| 2059050 | 7/1995 | (CA) . | |
| 2044563 | 10/1995 | (CA) . | |
| 0157754 | * 7/1985 | (JP) | 198/345.3 |
| 0295144 | * 12/1988 | (JP) | 198/345.3 |
| 403223011 | * 10/1991 | (JP) | 198/867.13 |

* cited by examiner

Primary Examiner—Robert P. Olszewski
Assistant Examiner—Steven B. McAllister

(57) ABSTRACT

An apparatus for retention and release of pallets used in a production line system comprising pallets, means for advancing pallets, latching means, rolling means, and a rail member, wherein the latching means are pivotally coupled to the advancing means to allow pivoting of the latching means about a horizontal axis, the rolling means are affixed to the latching means, and the rail member is adapted to exert an upward force on the rolling means during advancement of the pallet for causing pivotal rotation of the latching means for sequential release of each pallet when removal of the pallet is desired.

5 Claims, 6 Drawing Sheets

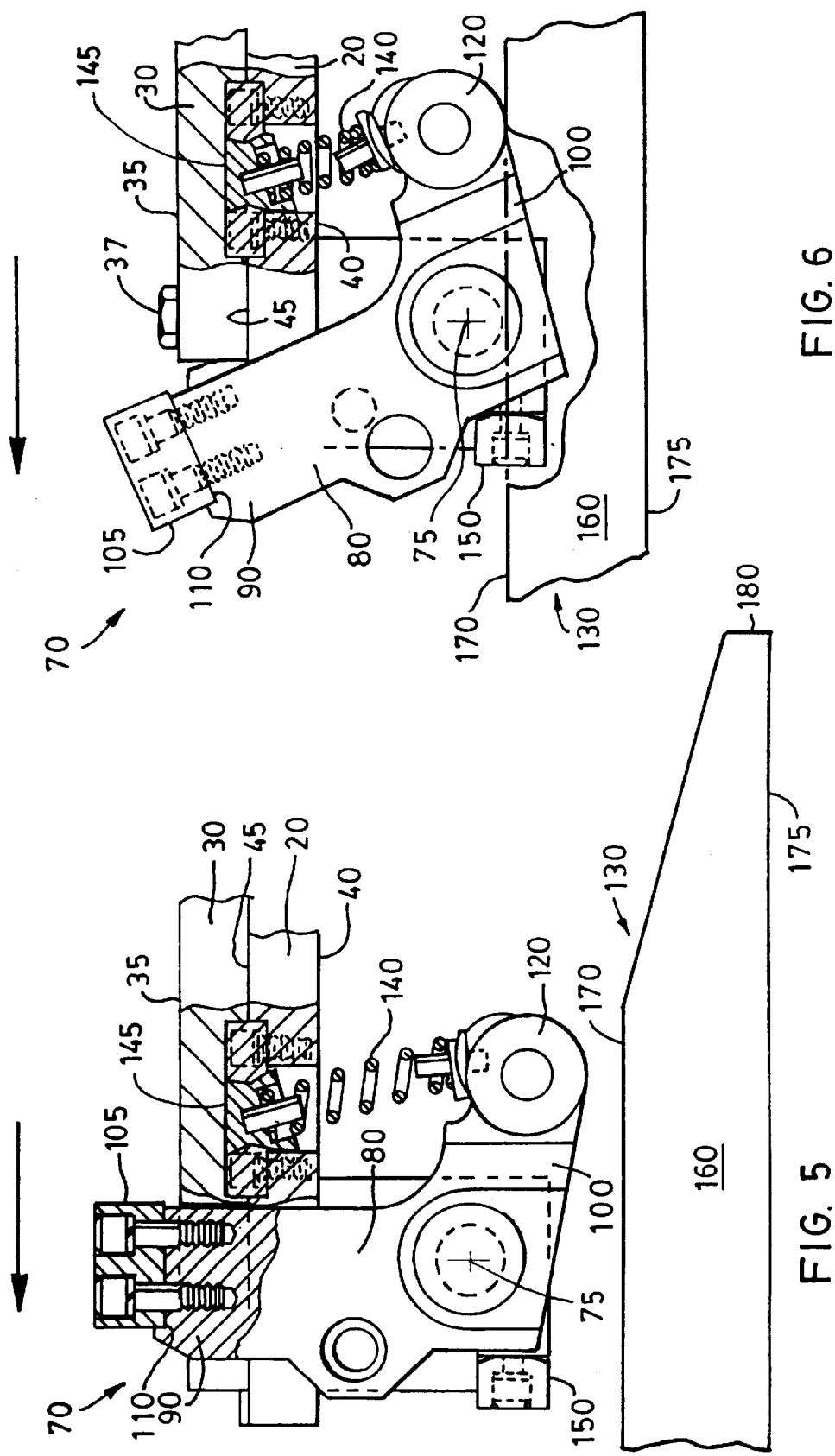

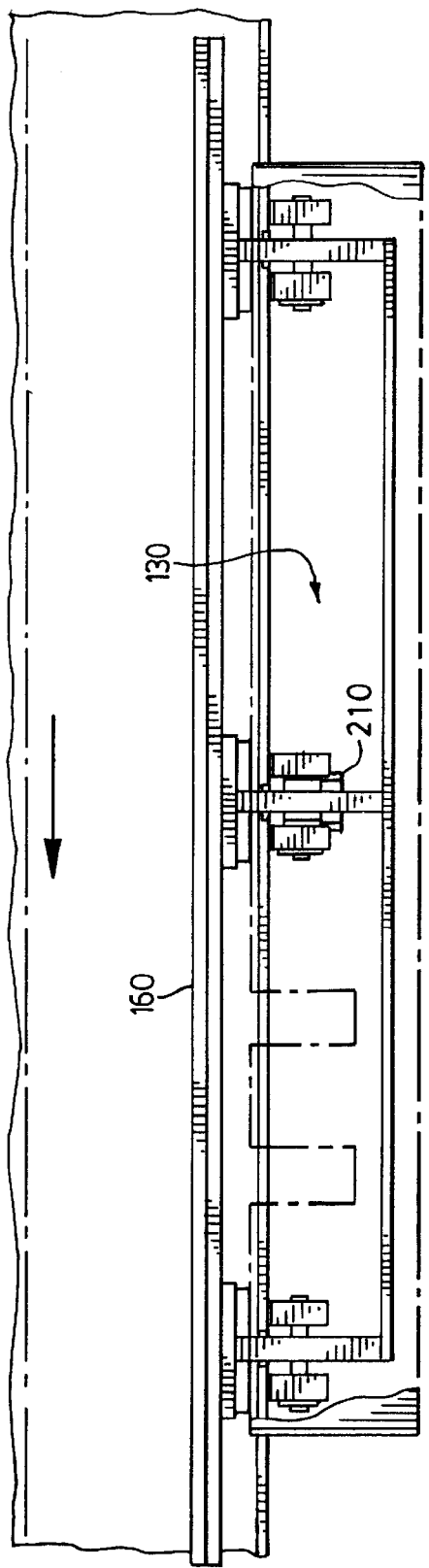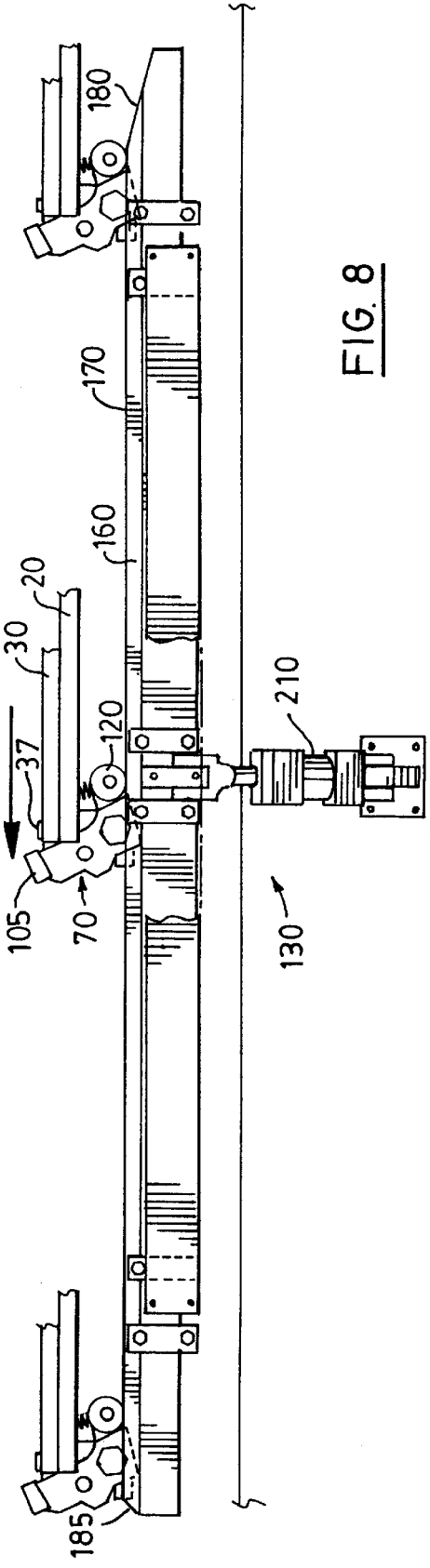

PALLET RETENTION AND RELEASE SYSTEM

This application claims benefit of provisional application No. 60/068,749 filed Dec. 24, 1997.

FIELD OF INVENTION

The present invention relates to the field of conveyor systems and, more particularly, relates to a pallet retention and release system for use with a conveyor chain which transports a variety of workpieces.

BACKGROUND OF INVENTION

Pallet conveyor systems are used in connection with production line systems, for example, in connection with high production grinding machines, which grind internal combustion engine blocks to transport workpieces between successive workstations enabling different operations to be performed on the workpieces and to reduce efficiency losses in handling the workpieces between the workstations. Workpieces which are handled in this manner can be placed on pallets, which are mounted on master platens which are mounted on a conveyor chain. The conveyor chain thus can transport the workpieces from workstation to workstation, enabling required operations to be performed at each workstation.

Most production line systems are designed to enable operations on a variety of workpieces of different dimensions to be performed. All workpieces cannot be mated to the same pallet if it is intended to handle such workpieces using a pallet conveyor system. Rather, because of dimensional differences between workpieces, each type of workpiece to be produced on a high production line often requires its own separate and unique pallet. Accordingly, when production systems must change-over to different workpieces, the conveyor system's pallets must be removed and replaced. In some circumstances, adjustments can be made to a pallet so that it can accommodate the new workpiece.

At other times, operations must be performed on workpieces at workstations remote from the conveyor chain and the workpiece must be removed from the conveyor chain. Once the operations are completed, it may be necessary to return the workpieces to the conveyor chain. In those cases, the pallet is removed with the workpieces from the conveyor chain and returned with the workpiece to the conveyor chain upon completion of the desired operation.

Pallet removal from the conveyor chain during change-over or otherwise is a time-intensive operation which causes losses to production efficiency. In removing pallets from the conveyor chain, fasteners must be manually loosened before the pallet is removed, and re-tightened when it or a new pallet is mounted back on the conveyor.

Accordingly, there exists a real need in the art for a pallet retention and release system which reduces the manual labour required during pallet removal and replacement and thereby reduces the time required.

SUMMARY OF THE INVENTION

It is an object of the invention to provide a pallet retention and release system which obviates or mitigates at least one of the disadvantages of the prior art.

In a first aspect of the present invention, there is provided a pallet retention and release system including pallets for supporting workpieces, means for advancing the pallets, an apparatus for securing the pallets to the advancing means comprising latching means, and rolling means, and a rail member.

The latching means can be pivotally coupled to the advancing means to allow pivoting of the latching means about an axis having a first orientation for releasably engaging a pallet, the rolling means is affixed to the latching means, and the rail member is adapted to be engaged by the rolling means to exert a force in a direction perpendicular to the first orientation on the rolling means during advancement of the pallet in a pallet changeover area for causing pivotal rotation of the latching means for disengaging said pallet when removal of the pallet is desired. The rail member is also disengageable from the rolling means so that the latching means secure the pallet to the advancing means.

In the alternative, removal of the pallet can be effected while the pallet is stationary in the pallet changeover area. The rail member can exert a force perpendicular to the first orientation on the rolling means while the pallet is stationary, thereby causing pivotal rotation of the latching means for disengaging said pallet when removal of the pallet is desired.

In a preferred embodiment, the latching means are urged by spring means into slidable engagement with the pallet. Engagement of the rolling means by the rail member urges the latching means in an upward direction, overcoming the downward forces of the spring means, causing pivotal rotation of the latching means, and thereby releasing the latching means from engagement with the pallet.

BRIEF DESCRIPTION OF THE DRAWING

Further objects and advantages will appear from the following detailed description of the invention, taken together with the following drawings, in which:

FIG. 5 is a side view, partly in section, taken along line 5—5 of FIG. 3, showing the rail member in the "down" condition;

FIG. 6 is a side view corresponding to FIG. 5, showing the rail member in the "up" condition;

FIG. 7 is an enlarged top view of the pallet retention and release system shown in FIG. 1, showing a rail release member; and FIG. 8 is a side view of the rail release assembly of FIG. 7, showing three assemblies in series, showing each of the pallets in an unsecured relationship with the respective master platen.

DETAILED DESCRIPTION OF THE INVENTION

The following discussion refers to a single master platen and a single pallet, but it is generally understood that the discussion extends to a plurality of similar master platens and pallets, each of which co-operates with the same pallet retention and release system.

Figure 1:
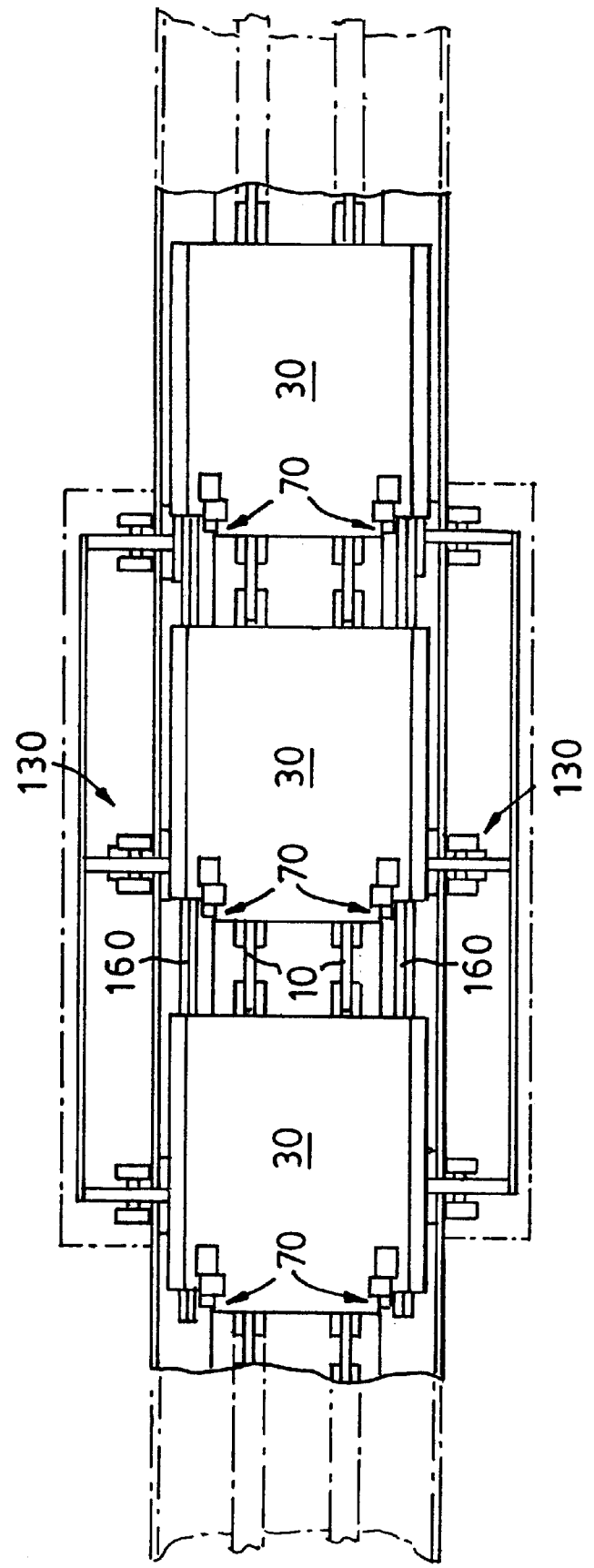
FIG. 1 is a top view of an embodiment of a pallet retention and release system.
Figure 2:
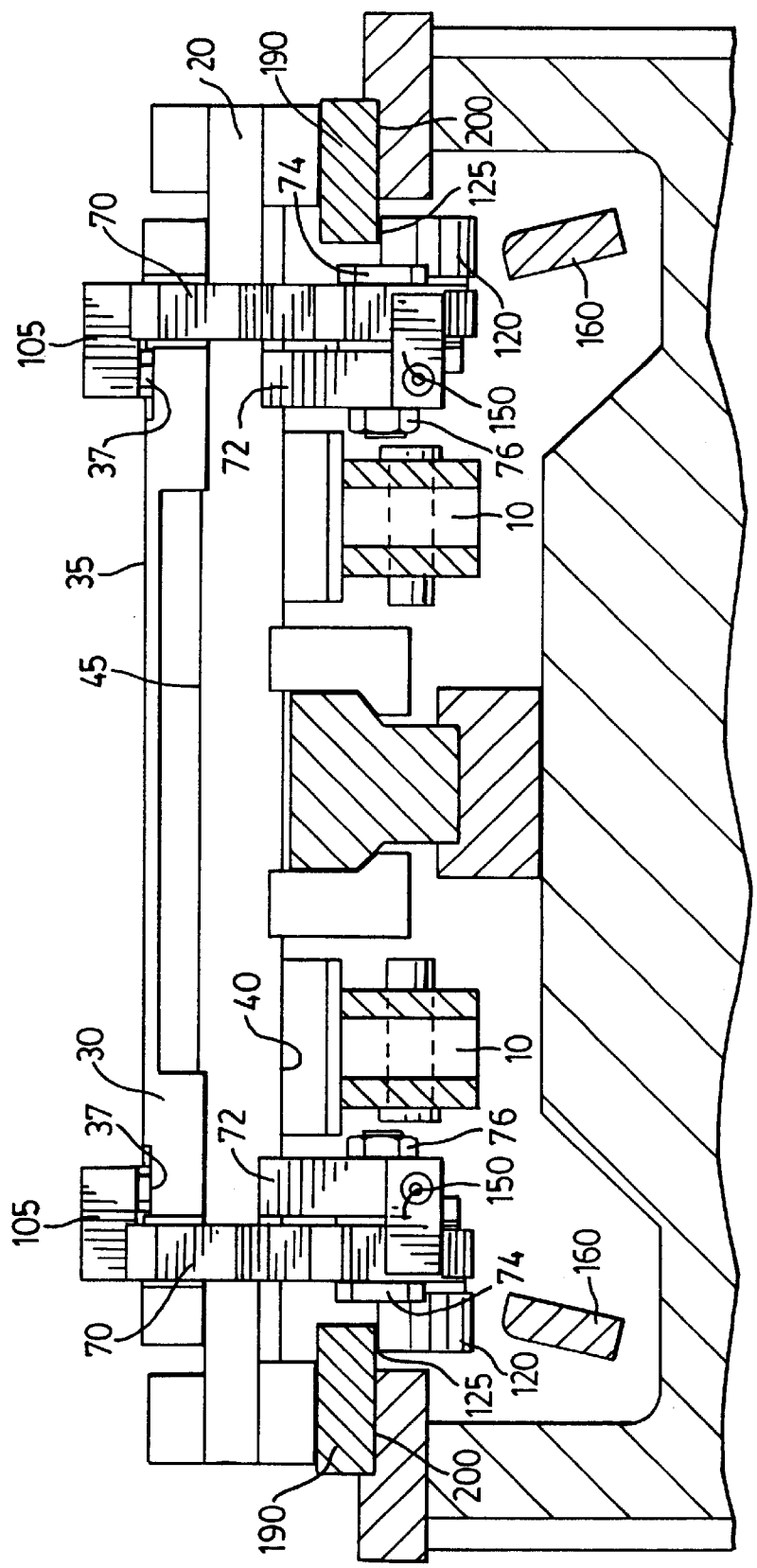
FIG. 2 is a transverse section, partly in elevation, taken along line 2—2 of FIG. 3.
Figure 3:
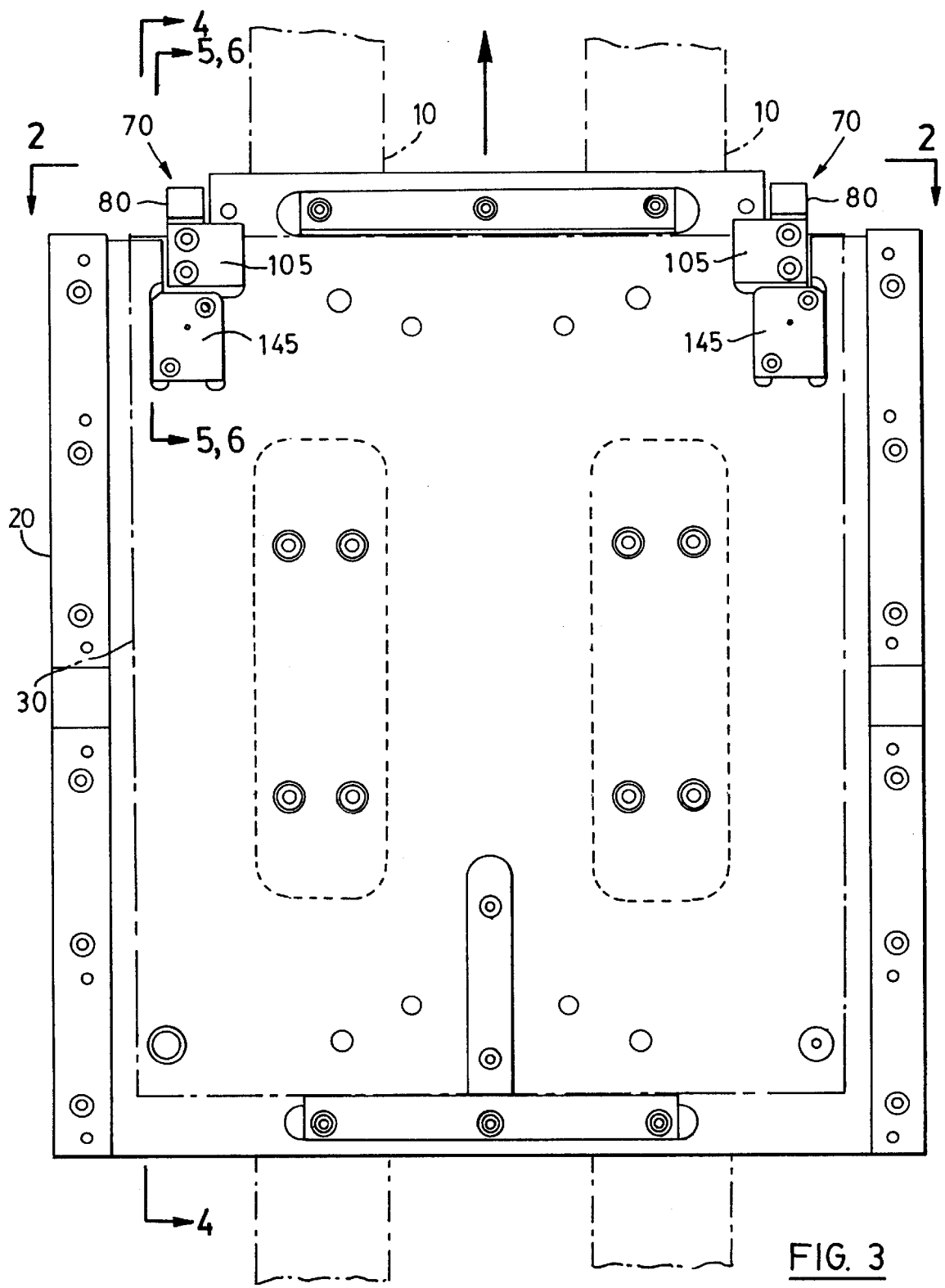
FIG. 3 is a top view of the master platen shown in FIG. 2.
Figure 4:
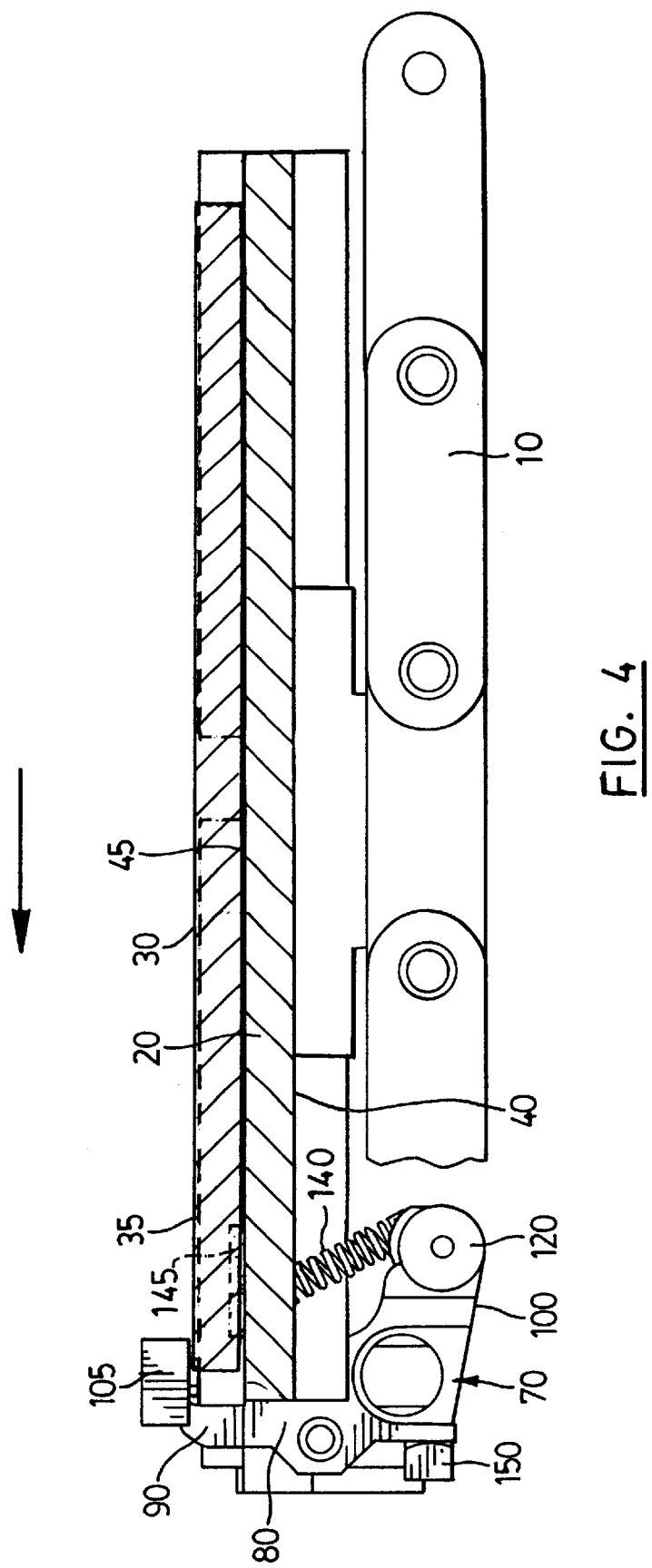
FIG. 4 is a side view of the master platen, the pallet, the latching means, the rolling means and the rail member shown in FIG. 2, showing the pallet in secured relationship with the master platen.

An embodiment of a pallet retention and release system is shown in FIGS. 1 and 2. As shown in FIG. 2, one embodiment of the invention includes a pair of equispaced conveyor chains 10, a master platen 20 and a pallet 30. The lower surface 40 of the platen 20 is specifically adapted to be secured to the conveyor chains 10 for purposes of transporting a workpiece (not shown) between workstations, such workpiece being supported by a corresponding pallet 30 which is mounted to the upper surface 45 of the master platen 20.

Referring to FIGS. 1, 2, 3, 4, 5 and 6, the pallet 30 is secured to the upper surface 45 of the master platen 20 with at least one latch assembly 70. The latch assembly 70 is capable of assuming open and closed conditions.

The latch assembly 70 is pivotally coupled to an upright member 72, which is secured to the master platen 20, by means of a connecting bolt 74 which permits pivotal rotation of the latch assembly 70 about a horizontal axis 75, about which the connecting bolt 74 is centered. A nut 76 is threadably received by the connecting bolt 74. Although the description herein will proceed with reference to the latch assembly 70 pivoting about the horizontal axis 75, it will be understood that the latch assembly 70 need not pivot about a horizontal axis, but can pivot about an axis which is vertical or which is oriented at an angle between horizontal and vertical.

The latch assembly 70 includes a lever 80 with upper 90 and lower 100 ends in substantially right-angled relationship with each other. The upper end 90 of the lever 80 terminates in a hardened locking wedge 105 whose lower surface 110 extends outward from and in substantially perpendicular relationship with the lever 80. The lower surface 110 of the locking wedge 105 is adapted to slidably engage a hardened button 37 located on the upper surface 35 of the pallet 30 when the latch assembly 70 is in the closed position, thereby securing the pallet 30 to the master platen 20.

Particularly referring to FIGS. 5 and 6, associated with the lower end 100 of the lever 80 are rolling means 120, oriented in parallel relationship with the direction of travel of the conveyor chains 10. The rolling means 120 are adapted to engage a release rail assembly 130.

FIG. 1 shows a plan view of a series of pallets 30, the conveyor chains 10, a series of latch assemblies 70, and the release rail assembly 130. Each latch assembly 70 is shown in the closed position in FIG. 1.

In a preferred embodiment, associated with the latch assembly 70 is a spring 140, secured at either end to each of a spring housing assembly 145 and lever 80 respectively, which urges the lower end 100 of the lever 80 in a downward direction. In order for the lever 80 to pivot about the horizontal axis 75, thereby opening the latch assembly 70, sufficient upward forces must be applied to the lever 80 to overcome the action of the spring 140. The configuration of the lever 80 is such that upward forces acting upon the wedge 105, when a workpiece is being ground, are taken through the lever 80's pivot point, i.e., the horizontal axis 75.

In an alternative embodiment, a stop bar 150 can be used, as shown in FIG. 5. A stop bar 150 can be used where the spring 140 is secured in captive arrangement between the master platen 20 and rolling means 120. The a stop bar 150 is associated with the latch assembly 70 to prevent counterclockwise pivoting (as viewed in FIGS. 5 and 6) of the lever 80 about a horizontal axis. The stop bar 150 is secured to the front surface of the upright member 72 which is secured to the lower surface 40 of the master platen 20 and extends outward, intersecting the path of the lever 80 should it pivot in the counterclockwise direction about a horizontal axis. If nothing is mounted on the upper surface 45 of the master platen 20, the force of the spring 140 urges the lower end 100 of the lever 80 in a downward direction. Without the stop bar 150, the lever 80 would pivot, resulting in downward displacement of the lower end 100, eventually causing the spring 140 to decouple from the latch assembly 70.

Referring to FIGS. 5, 6, 7 and 8, associated with the opening of the latch assembly 70 is the release rail assembly 130 which is only engaged by the rolling means 120 when pallet 30 removal is desirable, and more particularly, in the pallet changeover area 300. In this respect, the release rail assembly 130 is capable of assuming "up" and "down" conditions. Preferably, the release rail assembly 130 includes a longitudinally elongated rail member 160 having upper 170 and lower surfaces 175 and two ends 180 185, adapted to facilitate rolling of the rolling means 120 from the first end 180 of the upper surface 170 to the opposite end 185 thereof. The upper surface 170 includes an upward sloping portion at the first (i.e., leading) end 180 thereof adapted to be the point of initial engagement with the rolling means 120 when the release rail assembly 130 is in the "up" condition. The upper surface 170 also includes a downward sloping portion at the second end 185 thereof adapted to permit the rolling means 120 to roll off the rail member 160 as the conveyor chain 10 advances. Preferably associated with the release rail assembly 130 are actuating means 210, for example, a double-acting hydraulic cylinder containing a non-compressible fluid, for changing the position of the release rail assembly 130 from the "down" to the "up" condition and vice-versa.

In operation, to effect removal of the pallet 30, the pallet 30 and associated master platen 20 can be advancing with the conveyor chains 10 within the pallet changeover area 300 with the release rail assembly 130 in the "up" condition. As the master platen 20 travels above the release rail assembly 130, the rolling means 120 engage and climb the first end 180 of the upper surface 170 of the rail member 160. The rail member 160 exerts an upward force on the rolling means 120, overcoming the downwards force of the spring 140, causing the lever 80 to pivot in a counter-clockwise direction (as viewed in FIGS. 5 and 6) about the horizontal axis 75, thereby disengaging the locking wedge 105 from the hardened button 37 on the upper surface 35 of the pallet 30 and opening the latch assembly 70. Once the wedge 105 is disposed outside the region of space above the upper surface 35 of the pallet 30, the pallet 30 is uncoupled from the master platen 20. At that point, movement of the conveyor chains 10 is stopped, permitting removal of the pallet 30 from the upper surface 45 of the master platen 20.

In the alternative, removal of the pallet 30 can be effected while the pallet is stationary in the pallet changeover area 300. The release rail assembly 130 can be raised by actuating means 210, resulting in rail member 160 exerting an upward force on rolling means 120, overcoming the downward force of the spring 140. This causes the lever 80 to pivot in a counter-clockwise direction (as viewed in FIGS. 5 and 6) about the horizontal axis 75, thereby disengaging the wedge 105 from the hardened button 37 on the upper surface 35 of the pallet 30 and opening the latch assembly 70. Once the wedge 105 is disposed outside the region of space above the upper surface 35 of the pallet 30, the pallet 30 is uncoupled from the master platen 20, thereby permitting removal of the pallet 30 from the upper surface 45 of the master platen 20.

To secure a new pallet (or re-secure the old pallet) to the master platen 20 in the pallet change-over area 300, the conveyor chains 10 must be stationary, the region of space above the upper surface 45 of the master platen 20 defined by the perimeter of the master platen 20 must be free, and the release rail assembly 130 must be in the "up" condition. The pallet 30 is first mounted on the upper surface 45 of the master platen 20, and then he conveyor chains 10 are engaged to move forwards. As the conveyor chains 10 move forwards, the rolling means 120 move in contact with the rail member 160 and eventually roll off the second end 185 of the rail member 160. In doing so, the spring 140 urges the rolling means 120 in a downward direction, causing the lever 80 to pivot in a counter-clockwise direction (as viewed in FIGS. 5 and 6) about the horizontal axis 75, thereby causing slidable engagement of the wedge 105 with the hardened button 37 and upper surface 35 of the pallet 30, and thereby securing the pallet 30 to the master platen 20.

Preferably, a hardened clamping button 37 is coupled to the upper surface 35 of the pallet 30 and is adapted to be slidably engaged to the wedge 105 as shown in FIG. 6. Frequent opening and closing of the latch assembly 70 causes excessive wear to the upper surface 35 of the pallet 30. Accordingly, it is preferable to provide a removable part, such as the hardened clamping button 37, for slidable engagement with the wedge 105.

Referring to FIG. 2, in a further preferred embodiment, a wear rail 190 is further associated with the rolling means 120 to prevent inadvertent opening of the latch assembly 70. The wear rail 190 has a lower surface 200 adapted to remain in sliding contact with the upper edge 125 of the roller means 120 during movement of the master platen 20 by the conveyor chains 10, except when it is necessary to remove pallets 30 in the pallet change-over area 300. In this respect, the lower surface 200 of the wear rail 190 constrains upward movement of the roller means 120, and thereby prevents inadvertent opening of the latch assembly 70 when unanticipated forces act upward on the lower end 100 of the lever 80. Because the configuration of the lever 80 is such that upward forces acting upon the wedge 105 are taken through the horizontal axis 75, the spring 140 is not required to withstand such upward forces.

Although the disclosure describes and illustrates preferred embodiments of the invention, it is to be understood that the invention is not limited to these particular embodiments. Many variations and modifications will now occur to those skilled in the art.

I claim:

1. A pallet retention and release system for use in a production line for transportation of workpieces and for rapid installation and removal comprising:
   (a) pallets for supporting said workpieces;
   (b) means for advancing said pallets comprising a conveyor;
   (c) an apparatus for securing said pallets to said advancing means, including latching means and rolling means, wherein said latching means are connected to and pivotable upon said advancing means to allow pivoting of said latching means about an axis of the latching means, the axis having a first orientation for releasably engaging a pallet, said latching means including a locking wedge adapted for slidable engagement with a hardened button on an upper horizontal surface of said pallet to secure said pallet tightly to a platen mounted on the conveyor, and wherein said rolling means are affixed to said latching means; and
   (d) a rail member adapted to be engaged by the rolling means to exert a force in a direction perpendicular to said first orientation on said rolling means during advancement of said pallet for causing pivotal rotation of said latching means for disengaging said pallet when removal of said pallet is desired.

2. The pallet retention and release system as claimed in claim 1, wherein an adjustable support means urges said latching means into slidable engagement with the hardened button on said upper horizontal surface of said pallet to secure said pallet tightly to the platen mounted on the conveyor.

3. The pallet retention and release system as claimed in claim 2, wherein said adjustable support means is a spring means.

4. A pallet retention and release system for use in a production line for transportation of workpieces and for rapid installation and removal comprising:
   (a) pallets for supporting said workpieces;
   (b) means for advancing said pallets comprising a conveyor;
   (c) an apparatus for securing said pallets to said advancing means, including latching means, spring means, and rolling means, wherein said latching means are connected to and pivotable upon said advancing means to allow pivoting of said latching means about an axis of the latching means, the axis having a first orientation for releasably engaging a pallet, and said latching means include a locking wedge adapted for slidable engagement with a hardened button on an upper horizontal surface of said pallet, wherein said spring means urge said latching means into slidable engagement with the button on said pallet, wherein said rolling means are affixed to said latching means; and
   (d) a rail member adapted to be engaged by the rolling means to exert a force in a direction perpendicular to said first orientation on said rolling means during advancement of said pallet for causing pivotal rotation of said latching means for disengaging said pallet when pallet removal is desired, such engagement causing said pallet to be unsecured relative to said advancing means.

5. The pallet retention and release system as claimed in claim 4, wherein said first orientation of said axis is horizontal, and wherein said direction in which said force is to be exerted by said rail member is upward when said rail member is moved upward to an engaged position.

* * * * *